Dec. 28, 1937. O. L. DARGIS, JR 2,103,613
SAFETY BRAKE CONTROL
Filed Dec. 15, 1936

Inventor
O. L. Dargis, Jr.
By Clarence A. O'Brien
Hyman Berman
Attorneys

Patented Dec. 28, 1937

2,103,613

UNITED STATES PATENT OFFICE 2,103,613

SAFETY BRAKE CONTROL

Otis Louis Dargis, Jr., Cincinnati, Ohio

Application December 15, 1936, Serial No. 116,012

1 Claim. (Cl. 192—13)

This invention appertains to new and useful improvements in brake controls and more particularly to means for retaining the usual service brake applied while the clutch pedal is depressed thus permitting the driver to take his foot off of the brake and accelerate his motor without the car rolling forward or backward on an inclined road.

The principal object of the present invention is to provide a simple and inexpensive device of the above character which can be installed conveniently on present day braking systems.

Other important objects and advantages of the invention will become apparent to the reader of the following specification.

In the drawing:—

Figure 1:
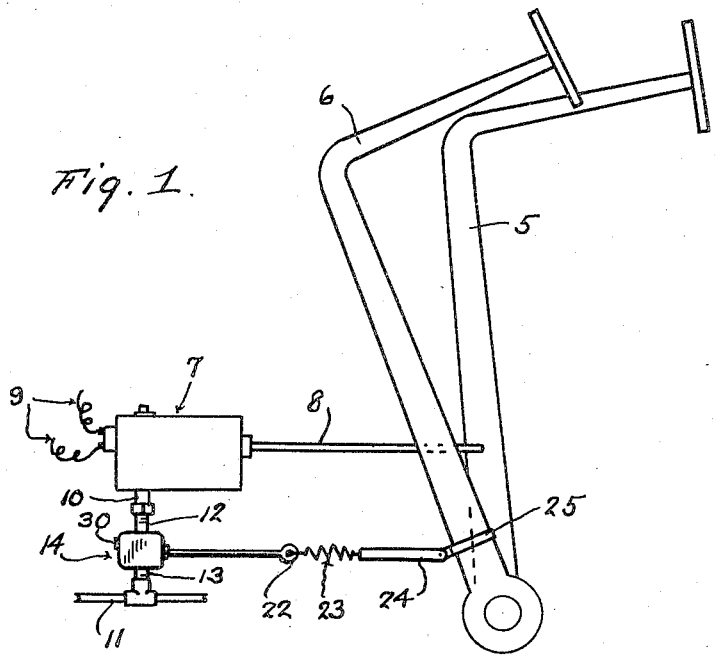
Figure 1 represents a side elevational view of the brake and clutch pedals in association with the fluid brake line control.
Figure 2:
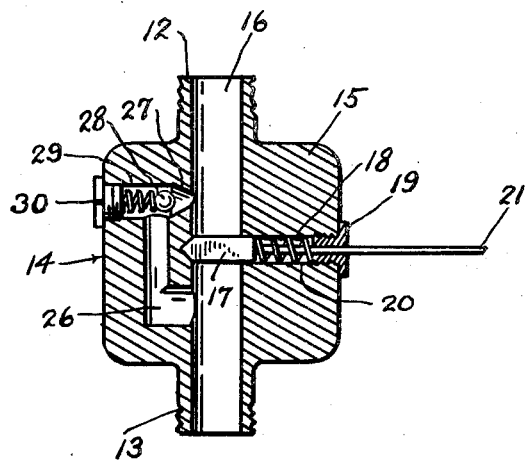
Figure 2 represents a vertical sectional view through the brake lining control.

Referring to the drawing wherein like numerals designate like parts, it can be seen in Figure 1 that numeral 5 represents the usual brake pedal while numeral 6 is the clutch pedal. The usual master brake chamber of a fluid brake system is generally referred to by numeral 7 and the plunger therein is connected to the brake pedal 5 by the rod 8. The conductors 9 go to the usual brake or stop light at the rear of the vehicle (not shown).

From the master brake chamber the tube 10 extends to connect to the lines 11 to the various brakes. This tube 10 is in a pair of sections each being connected to one of the threaded nipples 12—13 of the control generally referred to by numeral 14. This control consists of the block 15 generally of some suitable material having the bore 16 extending therethrough and through the nipples 12—13.

A needle valve 17 is slidably disposed across the bore 16, the same being operative in the pocket 18. This pocket is normally closed by the plug 19 and a spring 20 is interposed between this plug and the valve 17. A rod 21 extends from the needle valve 17, through the plug and has an eye 22 at its outer end to which one end of the spring 23 connects, the other end of the spring being connected to the link 24 which extends from the clamp 25 on the clutch pedal 6.

Around the needle valve 17 is the by-pass 26, one end of which is unobstructed, while the other end is reduced as at 27 to provide a seat for the ball 28, which ball is normally maintained seated by the spring 29, the spring being interposed between the ball and the removable plug 30. It can now be seen, that when the brake pedal 5 is operated fluid from the master cylinder is free to pass through the bore 16 of the control to the brake lines 11 and it is immaterial just when the clutch pedal 6 is depressed to close off the bore 6 with the needle valve 17 for if the brakes have not been entirely applied and more pressure is required, the fluid from the master cylinder will take the by-pass route 26 around the needle valve 17. However, when the brake pedal 5 is released and the clutch pedal is in depressed position, no fluid can return to the master cylinder from the brakes as the check valve 28 will block its passage. Thus the brakes will be held in applied position until the clutch pedal 6 is released.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:—

The combination with the compressor cylinder and piston of a hydraulic brake system, a brake pedal for operating the piston to effect compression in said cylinder, and a clutch pedal, of a control valve interposed in the line of connection between the cylinder and brakes, said valve comprising a block-like casing having a through port therein for the passage of fluid therethrough from said cylinder and a by-pass therein including inlet and outlet ends communicating with said through port, a tensioned ball check normally closing the inlet end of said by-pass and means for closing and opening said through port under control of the clutch pedal and comprising a plunger slidable in said casing across said port and intermediate the by-pass ends into opening and closing positions, respectively, and tensioned for movement to closing position.

OTIS L. DARGIS, JR.